US010148929B2

(12) United States Patent
Huang et al.

(10) Patent No.: US 10,148,929 B2
(45) Date of Patent: Dec. 4, 2018

(54) METHOD OF PROMPTING PROPER ROTATION ANGLE FOR IMAGE DEPTH ESTABLISHING

(71) Applicant: HTC Corporation, Taoyuan County (TW)

(72) Inventors: Liang-Kang Huang, Taoyuan County (TW); Yu-Ting Lee, Taoyuan County (TW); Tzu-Hao Kuo, Taoyuan County (TW); Chun-Hsiang Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 172 days.

(21) Appl. No.: 14/252,791

(22) Filed: Apr. 15, 2014

(65) Prior Publication Data

US 2014/0307053 A1  Oct. 16, 2014

Related U.S. Application Data

(60) Provisional application No. 61/811,817, filed on Apr. 15, 2013.

(51) Int. Cl.
*G06T 7/593* (2017.01)
*H04N 13/02* (2006.01)

(52) U.S. Cl.
CPC ......... *H04N 13/0221* (2013.01); *G06T 7/593* (2017.01)

(58) Field of Classification Search
CPC .................................................. H04N 13/0221
USPC .......................................................... 348/46
See application file for complete search history.

(56) References Cited

U.S. PATENT DOCUMENTS

| 6,094,215 A | * | 7/2000 | Sundahl | G03B 35/02 |
| | | | | 348/155 |
| 2008/0204566 A1 | * | 8/2008 | Yamazaki | G03B 5/00 |
| | | | | 348/208.99 |
| 2011/0025829 A1 | * | 2/2011 | McNamer | H04N 13/021 |
| | | | | 348/50 |
| 2013/0016038 A1 | * | 1/2013 | Yu | G06F 3/005 |
| | | | | 345/156 |
| 2013/0038701 A1 | | 2/2013 | Hung et al. | |

(Continued)

FOREIGN PATENT DOCUMENTS

| CN | 101751910 A | 6/2010 |
| CN | 102428707 A | 4/2012 |

(Continued)

OTHER PUBLICATIONS

Corresponding Taiwanese Office Action that these art references were cited.

(Continued)

*Primary Examiner* — Jeremiah C Hallenbeck-Huber
*Assistant Examiner* — Amir Shahnami
(74) *Attorney, Agent, or Firm* — CKC & Partners Co., Ltd.

(57) ABSTRACT

An electronic apparatus includes a motion sensor, an image capturing unit, a display unit and a processing unit. A controlling method for the electronic apparatus includes following steps. An initial orientation of the electronic apparatus is obtained by the motion sensor when a first image is captured by the electronic apparatus. A predetermined rotation angle relative to the initial orientation is assigned. A rotation prompt indicating the predetermined rotation angle is displayed via the display unit.

15 Claims, 9 Drawing Sheets

(56) References Cited

U.S. PATENT DOCUMENTS

| | | | | |
|---|---|---|---|---|
| 2013/0093839 A1* | 4/2013 | Jeon | ............ | H04N 13/0221 |
| | | | | 348/36 |
| 2013/0201301 A1* | 8/2013 | Huang | ............ | G03B 35/02 |
| | | | | 348/50 |
| 2014/0285637 A1* | 9/2014 | Cheng | ............ | H04N 13/0221 |
| | | | | 348/50 |

FOREIGN PATENT DOCUMENTS

| | | | | |
|---|---|---|---|---|
| CN | 102550015 A | 7/2012 | | |
| CN | 102841710 A | 12/2012 | | |
| TW | 200921467 A | 5/2009 | | |
| TW | 201303745 A | 1/2013 | | |
| WO | WO 2012002021 A1 * | 1/2012 | ............ | G02B 7/28 |

OTHER PUBLICATIONS

Corresponding Chinese Office Action that these art references were cited dated Nov. 1, 2016.

* cited by examiner

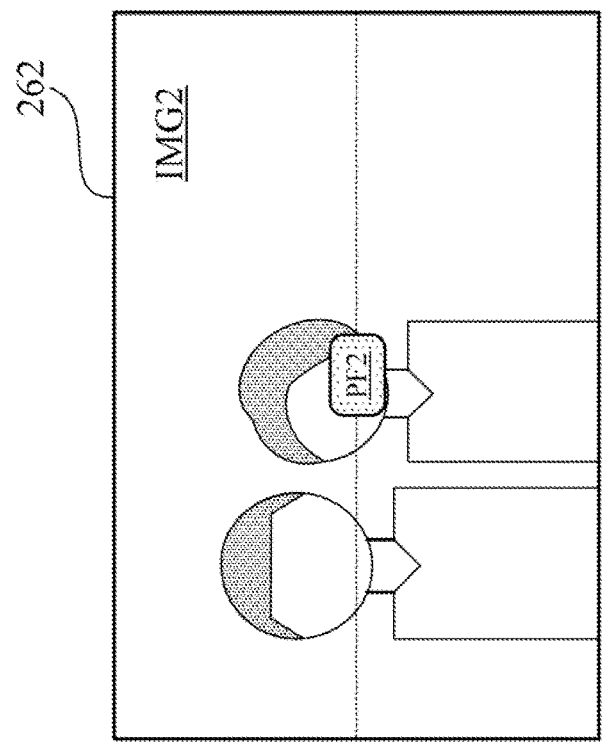
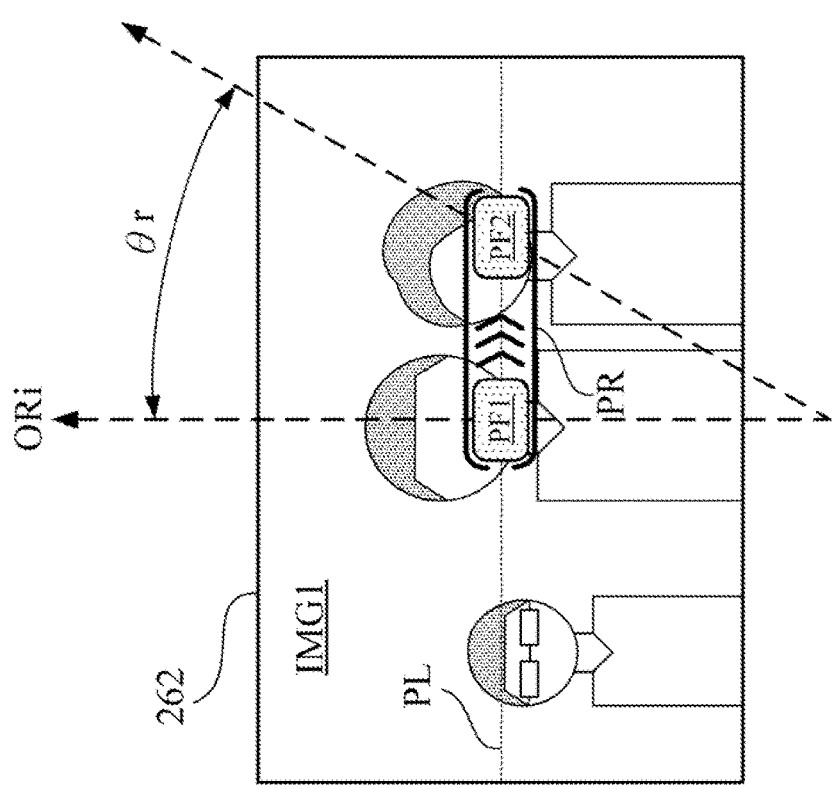
FIG. 3D
FIG. 3C

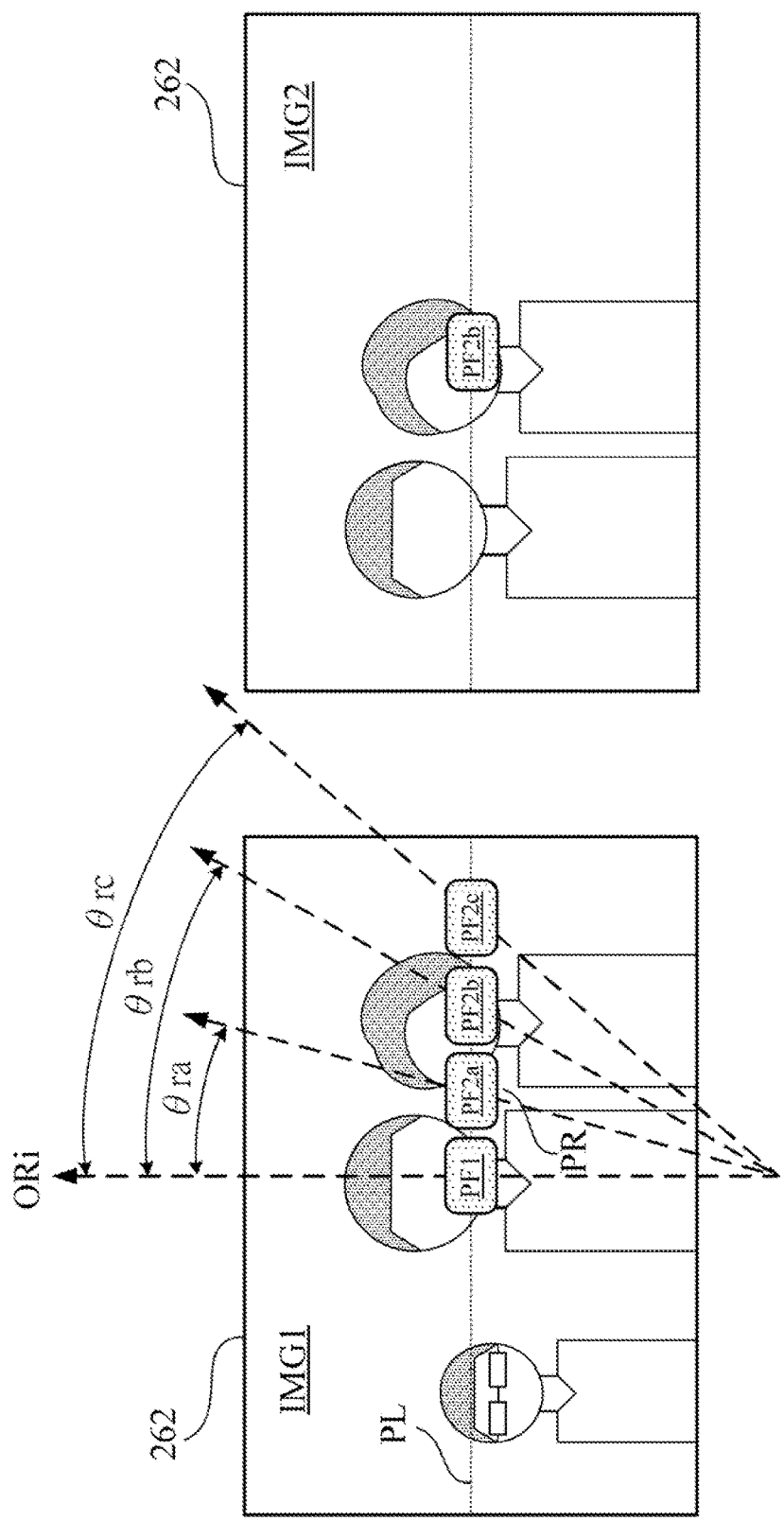

METHOD OF PROMPTING PROPER ROTATION ANGLE FOR IMAGE DEPTH ESTABLISHING

CROSS-REFERENCE TO RELATED APPLICATION

This application claims the priority benefit of U.S. Provisional Application Ser. No. 61/811,817, filed Apr. 15, 2013, the full disclosures of which are incorporated herein by reference

BACKGROUND

Field of Invention

The present application relates to a controlling method for an image capturing apparatus. More particularly, the present application relates to a controlling method of prompting a proper rotation angle for calculating depth information on an image capturing apparatus.

Description of Related Art

Stereoscopic image is based on the principle of human vision with two eyes. One conventional way to establish a stereoscopic image is utilizing two cameras separated by a certain gap to capture two images, which correspond to the same object(s) in a scene from slightly different positions/angles. The X-dimensional information and the Y-dimensional information of the objects in the scene can be obtained from one image. For the Z-dimensional information, these two images are transferred to a processor which calculates the Z-dimensional information (i.e., depth information) of the objects to the scene. The depth information is important and necessary for applications such as the three-dimensional (3D) vision, the object recognition, the image processing, the image motion detection, etc.

The digital images captured by one image capture device (e.g., camera) are two-dimensional on one visional angle. In order to obtain the depth information, two images taken from slightly different positions/angles are needed. As mentioned above, two images can be captured by two cameras separated by a certain gap in a conventional solution. However, this solution involving one extra camera for obtaining the depth information brings extra costs and extra weight.

Another solution for obtaining the depth information is utilizing a toe-out shooting model with one image capture device. Two (or more) images are sequentially captured while user rotating the device horizontally. These captured images are processed for calculating the depth information. However, user can hardly determine a suitable rotation angle or rotate the image capture device to meet a certain rotation angle, such that the toe-out shooting model will lack of accuracy.

SUMMARY

An aspect of the present disclosure is to provide a controlling method suitable for an electronic apparatus comprising a motion sensor and a display unit. The controlling method comprises following steps. An initial orientation of the electronic apparatus is obtained by the motion sensor when a first image is captured by the electronic apparatus. A predetermined rotation angle relative to the initial orientation is assigned. A rotation prompt indicating the predetermined rotation angle is displayed via the display unit.

Another aspect of the present disclosure is to provide a controlling method suitable for an electronic apparatus comprising a motion sensor and a display unit. The controlling method comprises following steps. An initial orientation of the electronic apparatus is obtained by the motion sensor when a first image is captured by the electronic apparatus. Plural predetermined rotation angles relative to the initial orientation are assigned. A rotation prompt with plural prompt frames is displayed via the display unit, and each of the prompt frames indicates one of the predetermined rotation angles.

Another aspect of the present disclosure is to provide electronic apparatus, which comprises a motion sensor, an image capturing unit, a display unit and a processing unit. The motion sensor is configured for sensing an orientation of the electronic apparatus. The display unit is configured for displaying a user interface. The processing unit is coupled with the motion sensor, the image capturing unit and the display unit. When the image capturing unit captures a first image, the motion sensor is configured for obtaining an initial orientation of the electronic apparatus, the processing unit is configured for generating at least one predetermined rotation angle relative to the initial orientation, and the display unit is configured for displaying a rotation prompt indicating the at least one predetermined rotation angle on the user interface.

BRIEF DESCRIPTION OF THE DRAWINGS

The disclosure can be more fully understood by reading the following detailed description of the embodiments, with reference made to the accompanying drawings as follows:

FIG. 3A, FIG. 3B, FIG. 3C and FIG. 3D illustrates an example of what the user interface of the display unit shows while capturing a first image and a second image according to an embodiment of the controlling method shown in FIG. 1;

DETAILED DESCRIPTION

In order to obtain depth information of objects, at least two images taken from slightly different positions/angles are needed. A displacement of a near object between two images will be larger than a displacement of a far object between two images, such that a stereo algorithm can establish the depth information according to the difference between the displacements.

Users can stand at the same spot and sequentially capture two images by rotating the electronic apparatus for capturing the images for depth recovery, and it is called as the toe-out shooting model. To recover depth information under the toe-out shooting model, the rotation angle must be obtained (known) in advance before performing the stereo algorithm. In addition, to reduce the difficulty of depth estimation, the electronic apparatus for capturing the images should move nearly parallel to a horizontal axis throughout the capturing process. However, it is hard for user to rotate the electronic apparatus manually and precisely by a certain rotation angle.

In some embodiments, this disclosure provides a controlling method for prompting user to rotate the electronic apparatus horizontally and precisely at a predetermined rotation angle in the toe-out shooting model.

Figure 1A:
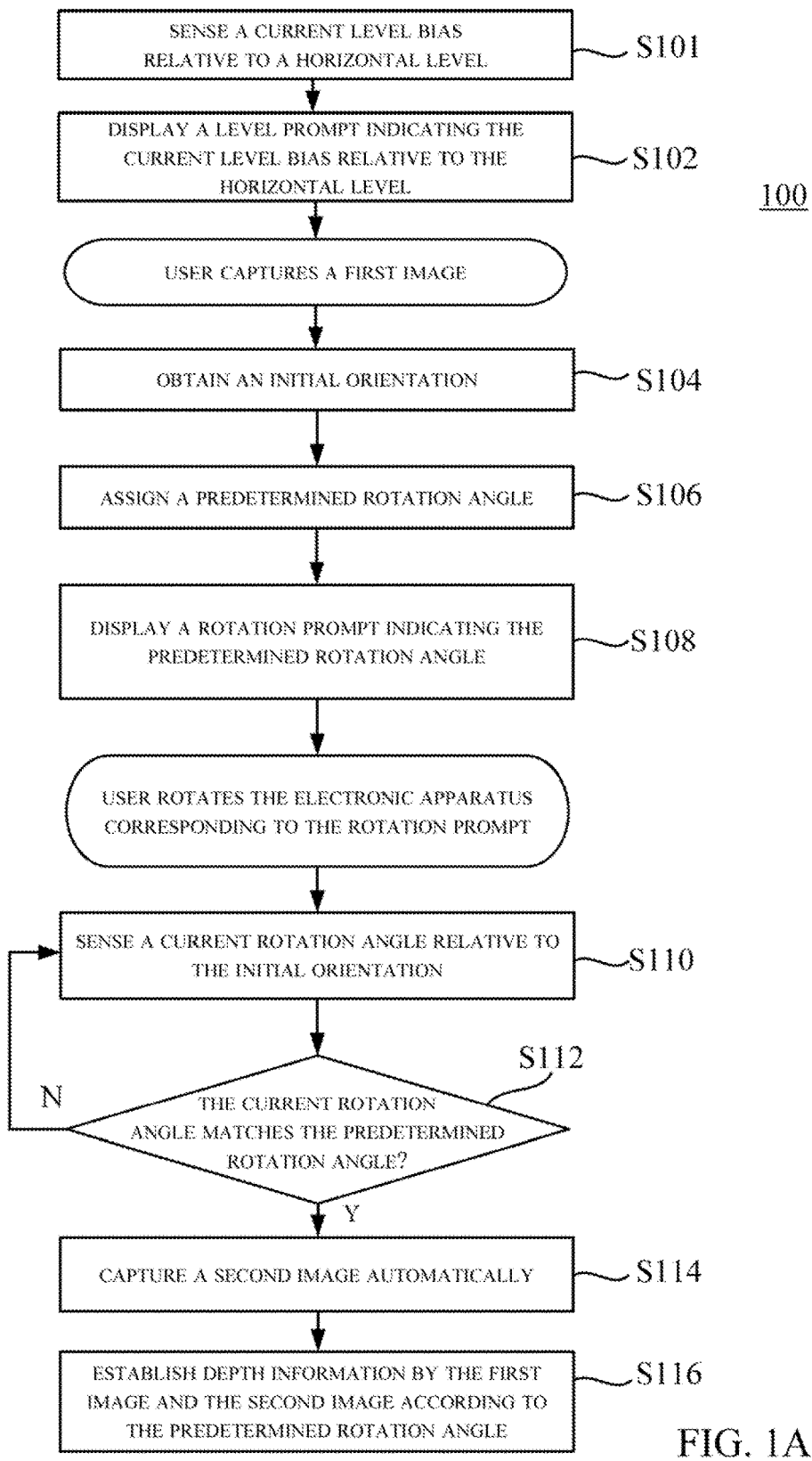
FIG. 1A is flow charts illustrating a controlling method according to an embodiment of this disclosure.
Figure 2:
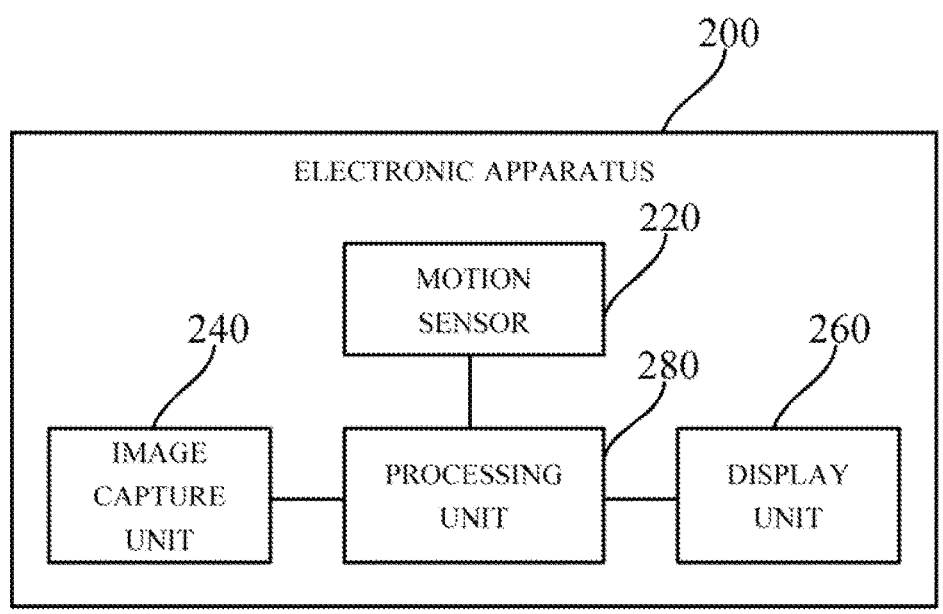
FIG. 2 is a schematic diagram illustrating an electronic apparatus suitable for performing the controlling method according to an embodiment of this disclosure.

Reference is made to FIG. 1A and FIG. 2. FIG. 1A is flow charts illustrating a controlling method 100 according to an embodiment of this disclosure. The controlling method 100 is suitable for an electronic apparatus, such as a digital camera, a digital camcorder, a video camera, a phone with a built-in camera, a smartphone, or any equivalent digital image capturing device. FIG. 2 is a schematic diagram illustrating an electronic apparatus 200 suitable for performing the controlling method according to an embodiment of this disclosure.

As shown in FIG. 2, the electronic apparatus 200 includes a motion sensor 220 an image capturing unit 240, a display unit 260 and a processing unit 280. The motion sensor 220 is configured for sensing an orientation of the electronic apparatus 200. The image capturing unit 240 is configured for capturing images. The display unit 260 is configured for displaying a user interface. When a user prepares to shoot an image by the electronic apparatus 200, the user interface on the display unit 260 will shows a preview screen including an image to be captured and some prompt icons related to the photo-shooting. The processing unit 280 is coupled with the motion sensor 220, the image capturing unit 240 and the display unit 260.

Reference is also made to FIG. 3A, FIG. 3B, FIG. 3C and FIG. 3D, which illustrates an example of what the user interface 262 of the display unit 260 shows while shooting a first mage IMG1 and a second image IMG2 according to an embodiment of the controlling method 100 shown in FIG. 1.

Figure 3A:
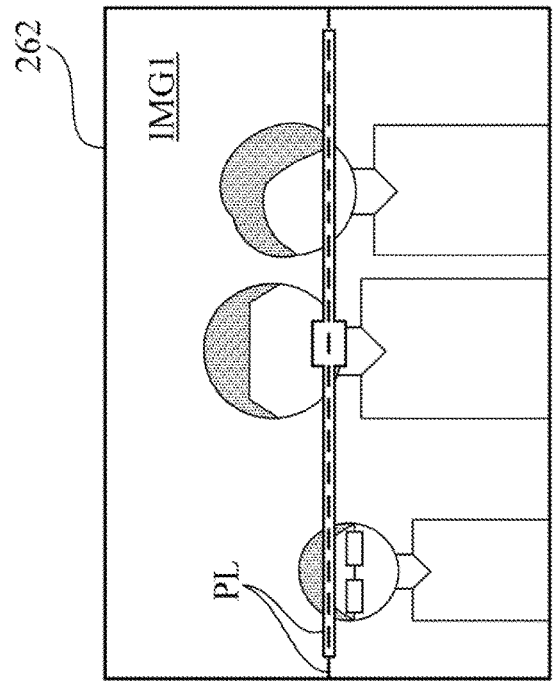

FIG. 3A shows an example of the user interface 262 before the first image IMG1 is captured. At this time, the user can hold the electronic apparatus 200 toward what he wants to shoot, and the user interface 262 will shows a preview screen.

In order to reduce the difficulty of depth estimation, the electronic apparatus 200 for capturing the images should move nearly parallel to a horizontal axis throughout the capturing process. Referring to FIG. 3A (along with FIG. 1A and FIG. 2), the controlling method 100 executes step S101 for sensing a current level bias θb relative to the horizon line by the motion sensor 220. The controlling method 100 executes step S102 for displaying a level prompt PL indicating the current level bias θb relative to the horizon line via the user interface 262 on the display unit 260. In the embodiment shown in FIG. 3A, the level prompt PL includes a transverse bar representing the horizon line and a dash line representing a horizontal axis of the electronic apparatus 200. In this way, the user can easily calibrate a horizontal level of the electronic apparatus 200 for eliminating the current level bias θb to zero by matching the transverse bar to the dash line of the level prompt PL.

Figure 3B:
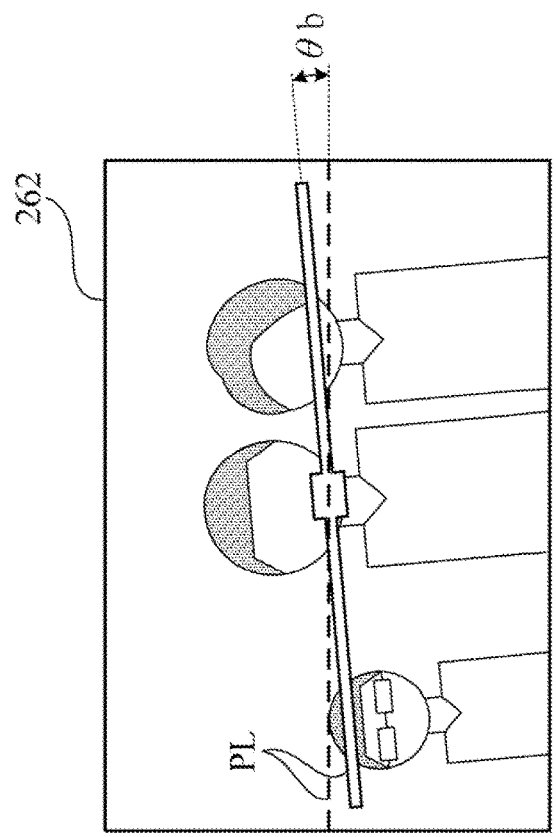

FIG. 3B shows the user interface 262 after the electronic apparatus 200 is calibrated to the horizon line. As shown in FIG. 3B, the transverse bar and the dash line of the level prompt PL are overlapped. At this time, user can capture the first image IMG1 toward a target scene, which depends on what the user wants to shoot, and the target scene is not limited to the example shown in FIG. 3B.

FIG. 3C shows the example when the first image IMG1 is captured. Referring to FIG. 3C (along with FIG. 1A and FIG. 2), when the user captures the first image IMG1 by the image capturing unit 240 of the electronic apparatus 200, the controlling method 100 executes step S104 for obtaining an initial orientation ORi of the electronic apparatus 200 by the motion sensor 220. The controlling method 100 executes step S106 for assigning a predetermined rotation angle θr relative to the initial orientation ORi. The controlling method 100 executes step S108 for displaying a rotation prompt PR indicating the predetermined rotation angle θr via the user interface 262.

In this embodiment, the rotation prompt PR includes a prompt frame PF1, another prompt frame PF2 and a track pattern between the prompt frame PF1 to the prompt frame PF2. The prompt frame PF1 corresponds to the initial orientation ORi, or the prompt frame PF1 can represent a current rotation angle while the user rotating the electronic apparatus 200. The prompt frame PF2 represents a rotation target, which help the user rotates the electronic apparatus 200 accordingly.

In this embodiment, the predetermined rotation angle θr can be a fixed rotation angle (such as 15°, 20°, 30°, etc), but the disclosure is not limited to a certain degree. A capturing visional angle of the first image IMG1 is a known value, which can be read from the image capturing unit 240, and the predetermined rotation angle θr is also a known value. The processing unit 280 projects the prompt frame PF2 on the user interface 262 according to the predetermined rotation angle θr.

For example, when the predetermined rotation angle θr is 30° and the visional angle of the first image IMG1 is 120°, the processing unit 280 projects the prompt frame PF2 on the right side of the prompt frame PF1, and the gap between two target frames TF1 and TF2 is ¼ wide of the user interface 262.

Afterward, the user can rotate the electronic apparatus 200 according to the rotation prompt PR. When the user rotates the electronic apparatus 200, the prompt frame PF1 can move dynamically according to a current rotation angle of the electronic apparatus 200.

During the rotation, the controlling method 100 executes step S110 for the current rotation angle relative to the initial orientation ORi and executes step S112 for determining whether the current rotation angle matches the predetermined rotation angle θr.

FIG. 3D shows the example of the user interface 262 when the current rotation angle of the electronic apparatus 200 matches the predetermined rotation angle θr. As shown in FIG. 3D, when the electronic apparatus 200 has been rotated by the predetermined rotation angle θr, the prompt frame PF2 will be moved to the center of the user interface 262 in this embodiment, and the prompt frame PF1 (not shown in FIG. 3D) will overlap with the prompt frame PF2. At that time, the controlling method 100 executes step S114 for capturing a second image automatically. Afterward, the controlling method 100 executes step S116 for establishing depth information (related to objects in the images IMG1/IMG2) by comparing the first image IMG1 and the second image IMG2 according to the predetermined rotation angle θr.

In order to recover depth information under the toe-out shooting model, a precise value of the rotation angle between two images must be obtained (known) in advance before performing the stereo algorithm. Based on aforesaid embodiment, the second image IMG2 is captured precisely at the predetermined rotation angle θr from the initial orientation ORi where the first image IMG1 is captured. Therefore, the rotation angle between the images IMG1/IMG2 is a known value (i.e., the predetermined rotation angle θr); such that the stereo algorithm can perform properly based on the first image IMG1 and the second image IMG2 according to the predetermined rotation angle θr.

In aforesaid embodiment, the predetermined rotation angle θr is assigned to a fixed value, but the disclosure is not limited to this. In order to optimize the depth establishing result of the stereo algorithm, a suitable value of the predetermined rotation angle θr depends on the depth of a target object, such as the distance between the target object and the electronic apparatus 200. When the target object is farther from the electronic apparatus 200, a larger rotation angle should be used between two images, such that the displacement of the far object can be noticed between two images. On the other hand, when the target object is closer to the electronic apparatus 200, a smaller rotation angle should be used.

Figure 1B:
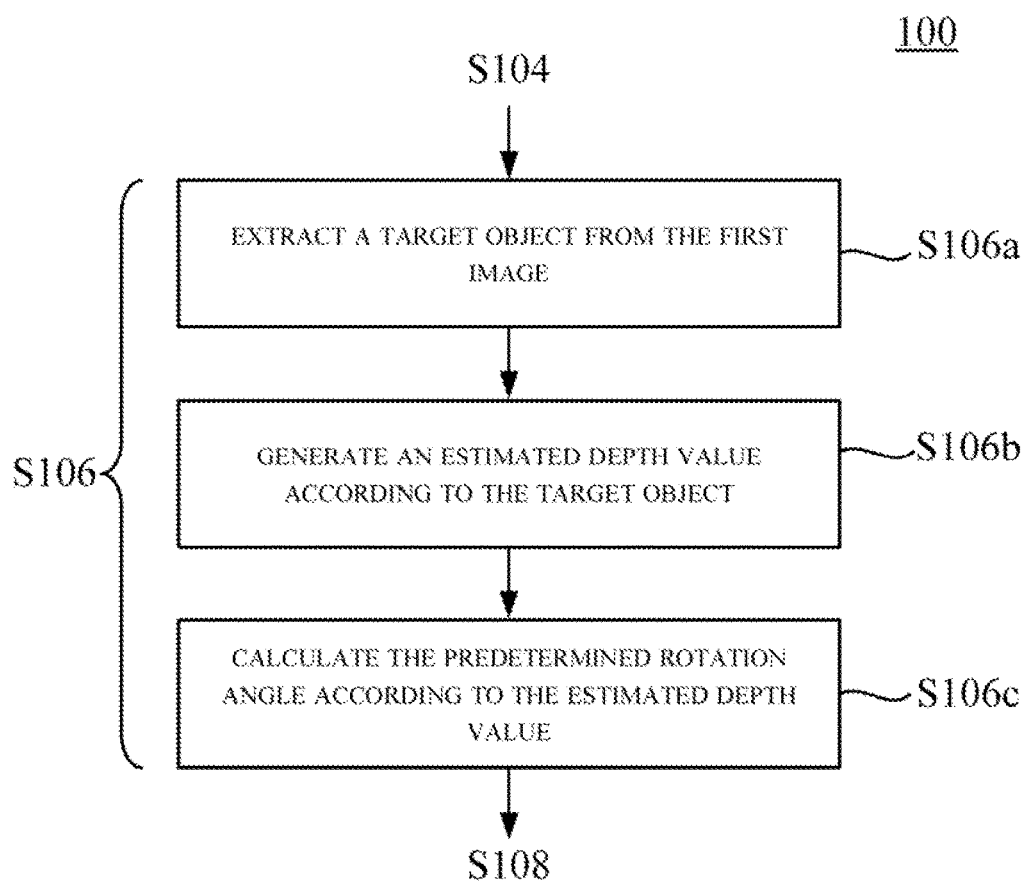
FIG. 1B is flow charts illustrating further steps within a step of the controlling method according to another embodiment of this disclosure.

Reference is made to FIG. 1B, which is flow charts illustrating further steps within the step S106 of the controlling method 100 according to another embodiment of this disclosure. As shown in the embodiment of FIG. 1B, step S106 for assigning the predetermined rotation angle further include three sub-steps S106a, S106b and S106c. Referring to FIG. 1B (along with FIG. 2 and FIG. 3C), the controlling method 100 executes step S106a for extracting a target object from the first image IMG1. The target object can be the man corresponding to the prompt frame PF1 in the center of the image IMG1. The controlling method 100 executes step S106b for generating an estimated depth value according to the target object. The controlling method 100 executes step S106c for calculating the predetermined rotation angle θr according to the estimated depth value.

In this embodiment, the predetermined rotation angle θr is no longer a fixed rotation angle (such as fixed at 30°). The predetermined rotation angle θr is positively correlated with the estimated depth value of the target object. When the target object is estimated to be farther from the electronic apparatus 200, the predetermined rotation angle θr will be assigned to be larger. When the target object is estimated to be closer to the electronic apparatus 200, the predetermined rotation angle θr will be assigned to be smaller. After the predetermined rotation angle θr is assigned, the controlling method 100 executes steps S108-S116 (referring to FIG. 1A and aforesaid descriptions).

In aforesaid embodiments shown in FIG. 3A, FIG. 3B, FIG. 3C and FIG. 3D, the prompt frame PF1 of the image IMG1 is assumed to be located at the center. However, the disclosure is not limited to this. Reference is made to FIG. 5E and FIG. 5F, which illustrates an example of what the user interface 262 of the display unit 260 shows while shooting a first image IMG1 and a second image IMG2 according to another embodiment of the controlling method 100 shown in FIG. 1.

Figure 3E:
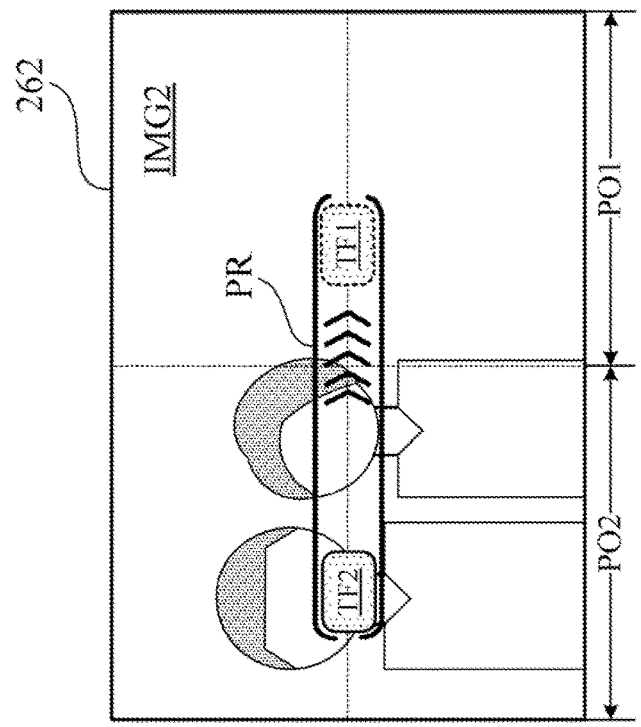
FIG. 3E and FIG. 3F illustrates another example of what the user interface of the display unit shows while capturing a first image and a second image according to an embodiment of the controlling method shown in FIG. 1.
Figure 3F:
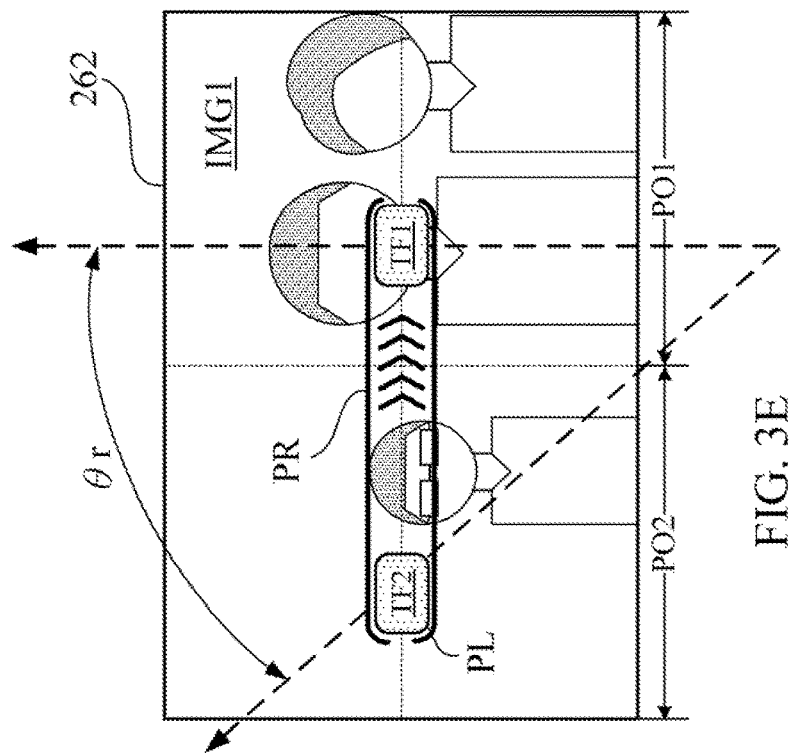

In the example shown in FIG. 3E and FIG. 3F, before the first image IMG1 is captured, a target frame TF1 is displayed and located at a first portion PO1 (the right side in this case) of the user interface 262, so as to prompt the user to place the target object into the target frame TF1 on the right side of the first image IMG1. After the first image IMG1 is captured, the controlling method 100 executes steps S104-S108. In step S108, the rotation prompt PR indicating the predetermined rotation angle θr is displayed on the user interface 262 (as shown in FIG. 3F). The rotation prompt PR includes a target frame TF2 and a track pattern between the target frame TF1 to the target frame TF2. The processing unit 280 projects the target frame TF2 on the user interface 262 on the left side of the target frame TF1 according to the predetermined rotation angle θr. The distance between the target frames TF1/TF2 is calculated in the same way disclosed in aforesaid embodiment about the prompt frames PF1/PF2.

As shown in FIG. 3F, the rotation prompt PR includes the target frame TF2, which is located to a second portion PO2 (the left side in this case) of the user interface 262. The target frame TF2 is configured for prompting the user to place the target object (the man corresponding to the target frame TF1 in FIG. 3E) into the target frame TF2 on the left side of the second image IMG2. Accordingly, the user is prompted to rotate the electronic apparatus to the right in order to place the target object (the man) into the target frame TF2. When the current rotation angle matches the predetermined rotation angle θr, the target object (the man) will be located in the target frame TF2, and the second image IMG2 is captured automatically.

The behavior of the target frame TF1/TF2 of the rotation prompt PR demonstrated in FIG. 3E and FIG. 3F is slightly different from the prompt frame PF1/PF2 in the embodiment demonstrated in FIG. 3C and FIG. 3D. However, the rotation prompt PR with the target frame TF1/TF2 demonstrated in FIG. 3E and FIG. 3F can ensure the images IMG1/IMG2 are captured from the right side and the left side relative to the target object (the man corresponding to the target frame TF1 in FIG. 3E and corresponding to the target frame TF2 in FIG. 3F), such that the depth information of the target object will be complete and optimized.

It is added that, the level prompt PL can be displayed on the user interface 262 during the whole capturing procedure. Steps S101 and S102 can be launched at any time if the current level bias θb relative to the horizon line is sensed by the motion sensor 220, not limited to be executed before the first image IMG1 is captured.

In aforesaid embodiments, one predetermined rotation angle is assigned at a time and the rotation prompt PR only corresponds to one predetermined rotation angle, but the disclosure is not limited to this.

Figure 4:
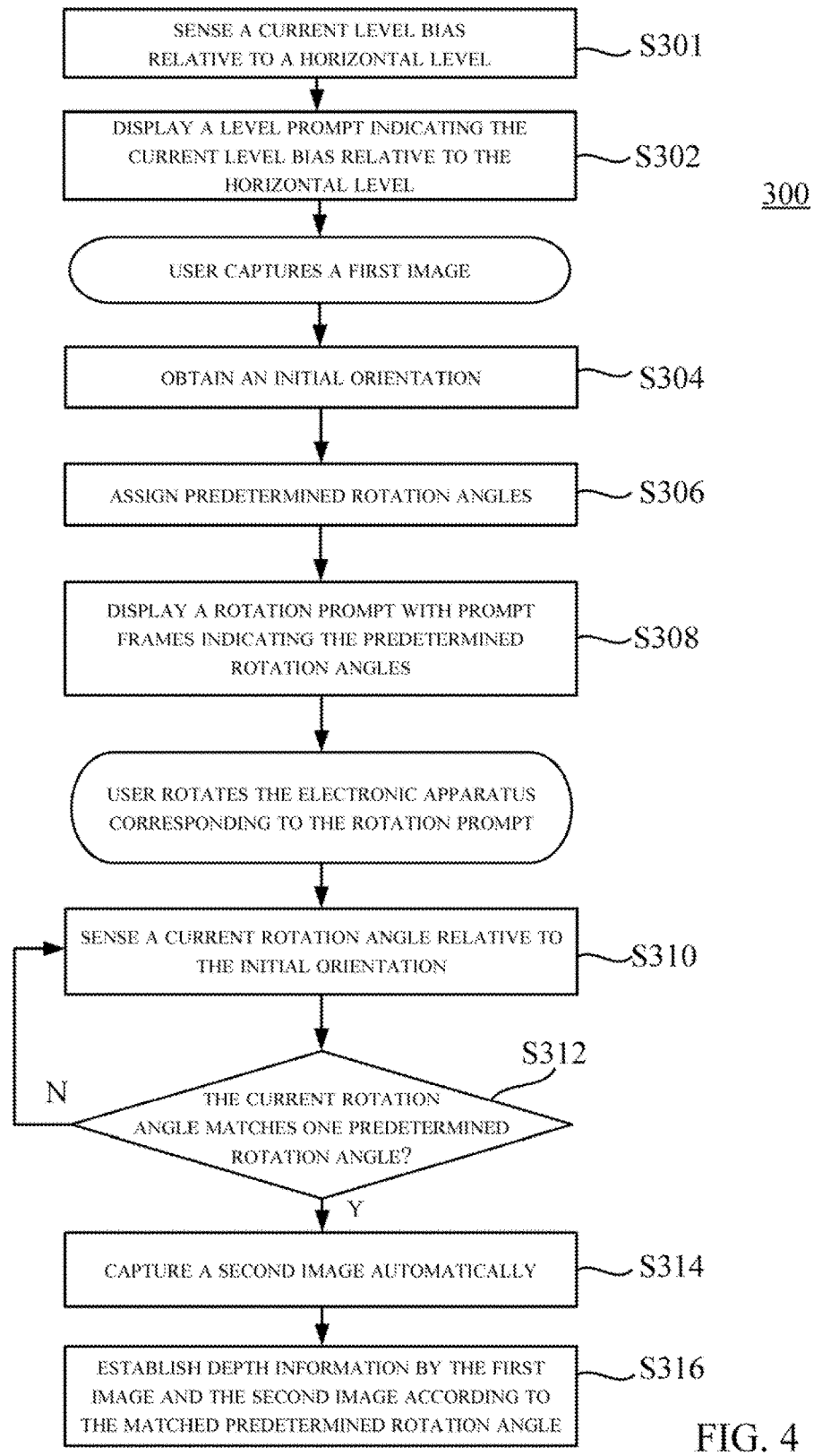
FIG. 4 is flow charts illustrating a controlling method according to another embodiment of this disclosure; and FIG. 5A, FIG. 5B, FIG. 5C

Reference is made to FIG. 4, which is flow charts illustrating a controlling method 300 according to another embodiment of this disclosure. The controlling method 300 is also suitable for the electronic apparatus 200 shown in FIG. 2.

Reference is also made to FIG. 5A, FIG. 5B, FIG. 5C and FIG. 5D, which illustrates an example of what the user interface 262 of the display unit 260 shows while shooting a first image IMG1 and a second image IMG2 according to an embodiment of the controlling method 300 shown in FIG. 4.

Figure 5A:
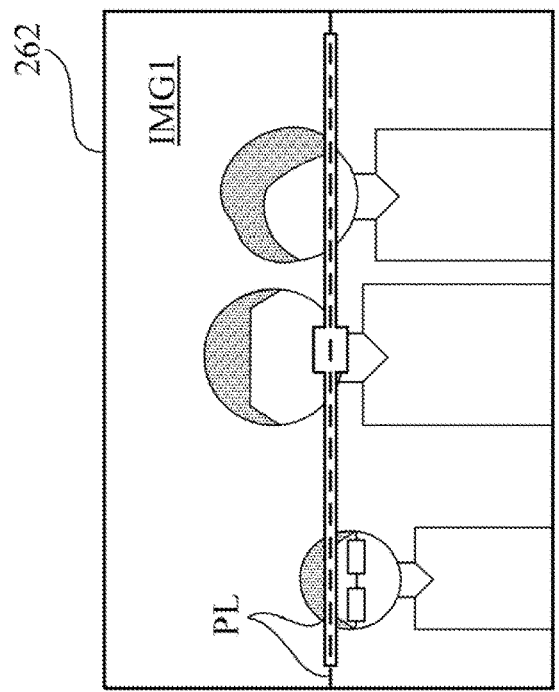
FIG. 5D illustrates an example of what the user interface of the display unit shows while capturing a first image and a second image according to an embodiment of the controlling method shown in FIG. 4.
Figure 5B:
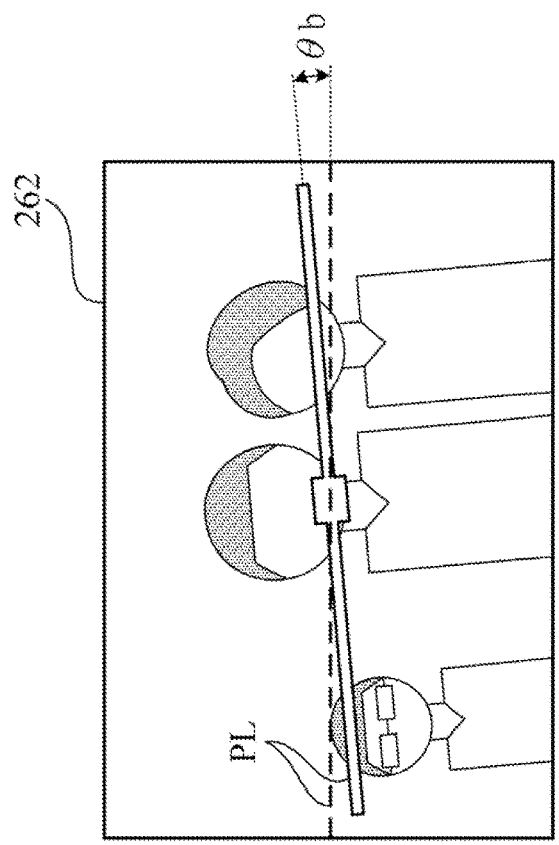

The embodiment shown in FIG. 5A and FIG. 5B and steps S301 to S304 shown in FIG. 4 are similar to FIG. 3A and FIG. 3B and steps S101 to S104 of the controlling method 100, and not to be repeated here.

FIG. 5C shows the example when the first image IMG1 is captured. Referring to FIG. 5C (along with FIG. 4 and FIG. 2), when the user captures the first image IMG1 by the image capturing unit 240 of the electronic apparatus 200, the controlling method 300 executes step S304 for obtaining an initial orientation ORi of the electronic apparatus 200 by the motion sensor 220. The controlling method 300 executes step S306 for assigning plural predetermined rotation angles (three predetermined rotation angles θra, θrb and θrc are assigned in this embodiment for demonstration) relative to the initial orientation ORi at the same time. The controlling method 100 executes step S308 for displaying a rotation prompt PR with plural prompt frames (three prompt frames PF2a, PF2b and PF2c are displayed in this embodiment for demonstration) indicating the predetermined rotation angles θr via the user interface 262 at the same time. In this embodiment, the rotation prompt PR includes a prompt frame PF1, prompt frames PF2a, PF2b, PF2c and a track pattern between the prompt frame PF1 to the prompt frames PF2a~PF2c. The prompt frame PF1 corresponds to the initial orientation ORi, or the prompt frame PF1 can represent a current rotation angle while the user rotating the electronic apparatus 200. Each of the prompt frames PF2a PF2c represents a rotation target, which help the user rotates the electronic apparatus 200 accordingly. In this embodiment, each of the prompt frames PF2a, PF2b or PF2c indicates one predetermined rotation angle θra, θrb or θrc. In other words, the frame PF2a indicates the predetermined rotation angle θra; the frame PF2b indicates the predetermined rotation angle θrb; and, the frame PF2c indicates the predetermined rotation angle θrc.

In this embodiment, the predetermined rotation angles θra, θrb or θrc can be assigned as different rotation angle, such as 15°, 30° and 45°, but the disclosure is not limited to a certain set of degrees.

A capturing visional angle of the first image IMG1 is a known value, which can be read from the image capturing unit 240, and the predetermined rotation angles θra, θrb and θrc are also known values. The processing unit 280 projects the prompt frames PF2a~PF2c on the user interface 262 according to the predetermined rotation angles θra~θrc. The detail theory of prompt frame projection is disclosed in aforesaid embodiment.

In order to optimize the depth establishing result of the stereo algorithm, a suitable value of the predetermined rotation angle depends on the depth of a target object, such as the distance between the target object and the electronic apparatus 200. When the target object is farther from the electronic apparatus 200, a larger rotation angle should be used between two images, such that the displacement of the far object can be noticed between two images. On the other hand, when the target object is closer to the electronic apparatus 200, a smaller rotation angle should be used.

In the embodiment of the controlling method 300, multiple predetermined rotation angles θra, θrb and θrc are assigned at the same time, and multiple prompt frames including the prompt frame PF2a (suitable for a near object), the prompt frame PF2b (suitable for an object in middle range) and the prompt frame PF2c (suitable for a far object) are displayed on the user interface 262 at the same time.

Afterward, the user can rotate the electronic apparatus 200 according to the rotation prompt PR as shown in FIG. 5C. When the user rotates the electronic apparatus 200, the prompt frame PF1 can move dynamically according to a current rotation angle of the electronic apparatus 200. Based on the distance between the target object and the electronic apparatus 200, the user can select one prompt frame from the prompt frames PF2a~PF2c to be the target prompt frame.

During the rotation, the controlling method 300 executes step S310 for the current rotation angle relative to the initial orientation ORi and executes step S312 for determining whether the current rotation angle matches the predetermined rotation angles θra, θrb and θrc.

FIG. 5D shows the example of the user interface 262 when the current rotation angle of the electronic apparatus 200 matches the predetermined rotation angle θrb from the predetermined rotation angles θra, θrb and θrc. As shown in FIG. 5D, when the electronic apparatus 200 has been rotated by the predetermined rotation angle θrb, the prompt frame PF2b will be moved to the center of the user interface 262 in this embodiment, and the prompt frame PF1 (not shown in FIG. 5D) will overlap with the prompt frame PF2b. At that time, the controlling method 300 executes step S314 for capturing a second image automatically. Afterward, the controlling method 300 executes step S316 for establishing depth information (related to objects in the images IMG1/IMG2) by comparing the first image IMG1 and the second image IMG2 according to the predetermined rotation angle θrb.

Similarly, if the current rotation angle of the electronic apparatus 200 matches another predetermined rotation angle (such as θra or θrc) from the predetermined rotation angles, the controlling method 300 executes step S316 for establishing depth information (related to objects in the images IMG1/IMG2) by comparing the first image IMG1 and the second image IMG2 according to the matched predetermined rotation angle θra or θrc.

Based on aforesaid embodiment, the second image IMG2 is captured precisely at the predetermined rotation angle from the initial orientation where the first image IMG1 is captured. Therefore, the rotation angle between the images IMG1/IMG2 is a known value (i.e., the predetermined rotation angle); such that the stereo algorithm can perform properly based on the first image IMG1 and the second image IMG2 according to the predetermined rotation angle. In addition, the horizontal movement is guaranteed by the level prompt.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims.

What is claimed is:
1. A controlling method, suitable for an electronic apparatus comprising a motion sensor and a display unit, the controlling method comprising:
obtaining an initial orientation of the electronic apparatus by the motion sensor, when a first image is captured by the electronic apparatus;
calculating a rotation angle relative to the initial orientation for calculating depth information; and
displaying a rotation prompt indicating the rotation angle via the display unit, wherein the display unit comprises an user interface;
wherein the step of calculating the rotation angle comprises:
extracting a target object from the first image;
generating an estimated depth value according to the target object; and
calculating the rotation angle according to the estimated depth value,
wherein when the estimated depth value equals to a first value, the electronic apparatus assigns the rotation angle to be a first angular degree, and
when the estimated depth value equals to a second value smaller than the first value, the electronic apparatus assigns the rotation angle to be a second angular degree smaller than the first angular degree;
wherein the step of displaying the rotation prompt comprises:

displaying a first prompt frame on the user interface, the first prompt frame corresponding to the initial orientation on the user interface, wherein the first prompt frame comprises a symbol;

displaying a second prompt frame on the user interface, the second prompt frame being spaced apart horizontally from the first prompt frame by a gap, the pap corresponding to the rotation angle, wherein the second prompt frame is positioned corresponding to a rotation target and comprises a symbol; and displaying a track pattern on the user interface between the first prompt frame and the second prompt frame wherein the track pattern indicates a direction that the electronic apparatus must be rotated to realize rotation of the electronic apparatus by the rotation angle:

wherein the first prompt frame is moved on the user interface as the electronic apparatus is rotated and overlaps the second prompt frame when the electronic apparatus has been rotated by the rotation angle.

2. The controlling method of claim 1, further comprising:
sensing a current rotation angle of the electronic apparatus relative to the initial orientation by the motion sensor;
capturing a second image by the electronic apparatus when the current rotation angle matches the rotation angle; and
establishing depth information by comparing the first image and the second image according to the rotation angle.

3. The controlling method of claim 1, further comprising:
sensing a current level bias relative to a horizon line by the motion sensor; and
displaying a level prompt indicating the current level bias relative to the horizon line via the display unit.

4. A controlling method, suitable for an electronic apparatus comprising a motion sensor and a display unit, the controlling method comprising:
obtaining an initial orientation of the electronic apparatus by the motion sensor, when a first image is captured by the electronic apparatus;
calculating a plurality of rotation angles relative to the initial orientation; and
displaying a rotation prompt via the display unit, wherein the display unit comprises an user interface;
wherein when a distance existed between the electronic apparatus and the target object equals to a first value, the electronic apparatus assigns the rotation angle to be a first angular degree, and
when the distance existed between the electronic apparatus and the target object equals to a second value smaller than the first value, the electronic apparatus assigns the rotation angle to be a second angular degree smaller than the first angular degree;
wherein the rotation prompt comprises a first prompt frame, a plurality of second prompt frames, and a track pattern, each of the plurality of second prompt frames indicating one of the rotation angles, and the step of displaying the rotation prompt comprises:
displaying the first prompt frame on the user interface, the first prompt frame corresponding to the initial orientation on the user interface, wherein the first prompt frame comprises a symbol;
displaying the plurality of second prompt frames on the user interface, each of the plurality of second prompt frames being spaced apart horizontally from the first prompt frame by a gap, the gap corresponding to one of the plurality of rotation angles, wherein each of the plurality of second prompt frames is positioned corresponding to a rotation target and comprises a symbol; and
displaying the track pattern on the user interface between the first prompt frame and the plurality of second prompt frames, wherein the track pattern indicates a direction that the electronic apparatus must be rotated to realize rotation of the electronic apparatus by one of the plurality of rotation angles;
wherein the first prompt frame is moved on the user interface as the electronic apparatus is rotated, and overlaps with one of the plurality of second prompt frames when the electronic apparatus has been rotated by one of the plurality of rotation angles.

5. The controlling method of claim 4, further comprising:
sensing a current rotation angle and a current orientation of the electronic apparatus relative to the initial orientation by the motion sensor;
capturing a second image by the electronic apparatus when the current rotation angle matches one of the rotation angles and the first prompt frame overlaps with one of the plurality of second prompt frames; and
establishing depth information by comparing the first image and the second image according to the matched one of the rotation angles.

6. The controlling method of claim 4, further comprising:
sensing a current level bias relative to a horizon line by the motion sensor; and
displaying a level prompt indicating the current level bias relative to the horizon line via the display unit.

7. An electronic apparatus, comprising:
a motion sensor, for sensing an orientation of the electronic apparatus;
an image capturing unit;
a display unit, for displaying a user interface; and
a processor, coupled with the motion sensor, the image capturing unit and the display unit,
wherein, when the image capturing unit captures a first image, the motion sensor is configured for obtaining an initial orientation of the electronic apparatus, the processor is configured for generating at least one rotation angle relative to the initial orientation, and the display unit is configured for displaying a rotation prompt indicating the at least one rotation angle on the user interface;
wherein the processor generates an estimated depth value according to a target object extracted from the first image and calculates the rotation angle according to the estimated depth value,
when the estimated depth value equals to a first value, the electronic apparatus assigns the rotation angle to be a first angular degree, and
when the estimated depth value equals to a second value smaller than the first value, the electronic apparatus assigns the rotation angle to be a second angular degree smaller than the first angular degree;
wherein the rotation prompt comprises:
a first prompt frame, wherein the first prompt frame is corresponding to the initial orientation on the user interface, and the first prompt frame comprises a symbol;
a second prompt frame, wherein the second prompt frame is being spaced apart horizontally from the first prompt frame by a gap, the gap is corresponding to the rotation angle, and the second prompt frame is positioned corresponding to a rotation target and comprises a symbol; and a track pattern provided between the first prompt frame and the second prompt frame, wherein the track pattern indicates a direction that the electronic apparatus must be rotated to realize rotation of the electronic apparatus by the rotation angle;

wherein the first prompt frame is moved on the user interface as the electronic apparatus is rotated, and overlaps the second prompt frame when the electronic apparatus has been rotated by the rotation angle.

8. The electronic apparatus of claim 7, wherein the motion sensor is further configured for sensing a current rotation angle of the electronic apparatus relative to the initial orientation, when the current rotation angle matches the rotation angle, the image capturing unit captures a second image, and the processor establishes depth information by comparing the first image and the second image according to the rotation angle.

9. The electronic apparatus of claim 7, wherein the motion sensor is further configured for sensing a current level bias relative to a horizon line, and the display unit is further configured for displaying a level prompt indicating the current level bias relative to the horizon line on the user interface.

10. The electronic apparatus of claim 7, wherein the processor is configured for assigning a plurality of rotation angles relative to the initial orientation in correspondence with different distances existed between the electronic apparatus and a target object within the first image.

11. The electronic apparatus of claim 10, wherein the rotation prompt comprises a plurality of second prompt frames, and each of the plurality of second prompt frames indicating one of the rotation angles.

12. The electronic apparatus of claim 11, wherein the motion sensor is further configured for sensing a current rotation angle of the electronic apparatus relative to the initial orientation, when the current rotation angle matches one of the rotation angles and the first prompt frame overlaps with one of the plurality of second prompt frames, the image capturing unit captures a second image, and the processor establishes depth information by comparing the first image and the second image according to the matched one of the rotation angles.

13. The controlling method of claim 1, wherein the second prompt frame is positioned at the center of the user interface when the electronic apparatus has been rotated by the rotation angle.

14. A controlling method, suitable for an electronic apparatus comprising a motion sensor and a display unit, wherein the display unit comprises an user interface, the controlling method comprising:

displaying a first target frame on the user interface before the first image is captured, wherein the first target frame is a symbol and prompts a user to place a target object at the first target frame;

obtaining an initial orientation of the electronic apparatus by the motion sensor, when the first image is captured by the electronic apparatus;

calculating a rotation angle relative to the initial orientation for calculating depth information; and displaying a rotation prompt indicating the rotation angle via the display unit;

wherein the step of calculating the rotation angle comprises:

extracting the target object from the first image;

generating an estimated depth value according to the target object; and calculating the rotation angle according to the estimated depth value;

wherein when the estimated depth value equals to a first value, the electronic apparatus assigns the rotation angle to be a first angular degree, and when the estimated depth value equals to a second value smaller than the first value, the electronic apparatus assigns the rotation angle to be a second angular degree smaller than the first angular degree;

wherein the step of displaying a rotation prompt comprises, after the first image is captured:

displaying a second target frame on the user interface, the second target frame being spaced apart horizontally from the first target frame by a gap, the gap corresponding to the rotation angle; and displaying a track pattern on the user interface between the first target frame and the second target frame, wherein the track pattern indicates a direction that the electronic apparatus must be rotated to realize the rotation angle;

wherein the second target frame prompts the user to rotate the electronic apparatus to place the target object at the second target frame, the target object being located at the second target frame when electronic apparatus has been rotated by the rotation angle.

15. The controlling method of claim 14, wherein the first target frame is located in a first portion of the display unit, the second target frame is located in a second portion of the display unit, and the first portion and the second portion are located on opposite halves of the display unit.

* * * * *